(12) United States Patent
Jennings et al.

(10) Patent No.: US 8,401,856 B2
(45) Date of Patent: Mar. 19, 2013

(54) AUTOMATIC NORMALIZATION OF SPOKEN SYLLABLE DURATION

(75) Inventors: Terry Jennings, Westminster, CO (US); Paul Roller Michaelis, Louisville, CO (US)

(73) Assignee: Avaya Inc., Basking Ridge, NJ (US)

( * ) Notice: Subject to any disclaimer, the term of this patent is extended or adjusted under 35 U.S.C. 154(b) by 320 days.

(21) Appl. No.: 12/781,162

(22) Filed: May 17, 2010

(65) Prior Publication Data
US 2011/0282650 A1   Nov. 17, 2011

(51) Int. Cl.
*G10L 13/06* (2006.01)
*G10L 13/00* (2006.01)
*G10L 17/00* (2006.01)

(52) U.S. Cl. .................. 704/267; 704/258; 704/246

(58) Field of Classification Search ............ 704/258, 704/262, 267, 271
See application file for complete search history.

(56) References Cited

U.S. PATENT DOCUMENTS

| | | | |
|---|---|---|---|
| 4,799,261 A | 1/1989 | Lin et al. | |
| 5,220,639 A | 6/1993 | Lee | |
| 5,444,817 A | 8/1995 | Takizawa | |
| 5,675,705 A | 10/1997 | Singhal | |
| 5,806,033 A * | 9/1998 | Lyberg ..................... | 704/255 |
| 5,809,467 A | 9/1998 | Otsuka et al. | |
| 5,828,994 A * | 10/1998 | Covell et al. ............. | 704/211 |
| 5,832,434 A | 11/1998 | Meredith | |
| 6,029,131 A | 2/2000 | Bruckert | |
| 6,185,533 B1 | 2/2001 | Holm et al. | |
| 6,317,713 B1 | 11/2001 | Tenpaku | |
| 6,397,185 B1 | 5/2002 | Komissarchik et al. | |
| 6,778,962 B1 * | 8/2004 | Kasai et al. ............... | 704/266 |
| 6,823,309 B1 | 11/2004 | Kato et al. | |

(Continued)

FOREIGN PATENT DOCUMENTS

| CN | 1912994 | 2/2007 |
|---|---|---|
| CN | 101105939 | 1/2008 |

(Continued)

OTHER PUBLICATIONS

Sundström, Anna "Automatic Prosody Modification as a Means for Foreign Language Pronunciation Training". In Proc. ISCA Workshop on Speech Technology in Language Learning, Marholmen, Sweden, 1998.*

(Continued)

*Primary Examiner* — Jesse Pullias
(74) *Attorney, Agent, or Firm* — Sheridan Ross P.C.

(57) ABSTRACT

A very common problem is when people speak a language other than the language which they are accustomed, syllables can be spoken for longer or shorter than the listener would regard as appropriate. An example of this can be observed when people who have a heavy Japanese accent speak English. Since Japanese words end with vowels, there is a tendency for native Japanese to add a vowel sound to the end of English words that should end with a consonant. Illustratively, native Japanese speakers often pronounce "orange" as "orenji." An aspect provides an automatic speech-correcting process that would not necessarily need to know that fruit is being discussed; the system would only need to know that the speaker is accustomed to Japanese, that the listener is accustomed to English, that "orenji" is not a word in English, and that "orenji" is a typical Japanese mispronunciation of the English word "orange."

14 Claims, 3 Drawing Sheets

U.S. PATENT DOCUMENTS

| | | | |
|---|---|---|---|
| 6,873,953 B1 | 3/2005 | Lennig | |
| 6,889,186 B1 | 5/2005 | Michaelis | |
| 6,975,987 B1 | 12/2005 | Tenpaku et al. | |
| 7,031,922 B1 * | 4/2006 | Kalinowski et al. | 704/271 |
| 7,136,816 B1 | 11/2006 | Strom | |
| 7,143,038 B2 | 11/2006 | Katae | |
| 7,539,296 B2 | 5/2009 | Basson et al. | |
| 7,996,222 B2 * | 8/2011 | Nurminen et al. | 704/250 |
| 8,027,836 B2 * | 9/2011 | Baker et al. | 704/260 |
| 2002/0173333 A1 * | 11/2002 | Buchholz et al. | 455/527 |
| 2004/0067471 A1 * | 4/2004 | Bennett | 434/167 |
| 2004/0215453 A1 * | 10/2004 | Orbach | 704/231 |
| 2005/0038656 A1 * | 2/2005 | Simpson | 704/260 |
| 2006/0069561 A1 * | 3/2006 | Beattie et al. | 704/251 |
| 2007/0038452 A1 | 2/2007 | Blair et al. | |
| 2008/0147404 A1 | 6/2008 | Liu et al. | |
| 2009/0004633 A1 | 1/2009 | Johnson et al. | |

FOREIGN PATENT DOCUMENTS

| | | |
|---|---|---|
| CN | 101653943 | 2/2010 |
| WO | WO 98/14934 | 4/1998 |

OTHER PUBLICATIONS

Official Action for United Kingdom Patent Application No. GB1108152.8, dated Mar. 1, 2012 1 page.

Search Report for United Kingdom Patent Application No. GB1108152.8, dated Sep. 1, 2011 5 pages.

Official Action with English translation for China Patent Application No. 20110184224.9, dated May 9, 2012 13 pages.

Michaelis, Paul Roller, "Speech Digitization and Compression" In W. Warkowski (Ed.), International encyclopedia of ergonomics and human factors, 2nd edition. London: Taylor and Francis, 2006, 1135-1139.

* cited by examiner

AUTOMATIC NORMALIZATION OF SPOKEN SYLLABLE DURATION

FIELD

In exemplary embodiment is directed toward enhancing communications understandability. More specifically, an exemplary embodiment is directed toward an automatic real-time correction of a type of mispronunciation that is common when people speak a language other then the one to which they are accustomed.

BACKGROUND

Even when two people are speaking the same language, and have a good command of that language's vocabulary and grammar, differences between them in their manner of speaking, e.g., accent, pronunciation accuracy, prosody, speech, pitch, cadence, intonation, co-articulation, syllable emphasis, and syllable duration, can affect the ease with which they understand each other's speech.

In theory, it should be possible to process the speech from person A and manipulate it digitally so that the aspects of A's speech that make it hard for B to understand are reduced or eliminated. In practice, it is hard to envision being able to do this reliably for all of the above factors in anything close to real-time. This is because appropriate automatic manipulation of most of the above factors cannot be achieved by a straight-forward acoustic analysis, and would instead require a syntactic and semantic understanding of what is being said. One exception of this is syllable duration.

Nearly all modern speech-based computer and communication systems transmit, route, or store speech digitally. One obvious advantage of digital techniques over analog is the ability to provide superior audio quality (for example, compact discs versus phonograph records, or digital cellular telephones versus analog). Other advantages include the ability to send many more simultaneous transmissions over a single communications channel, route speech communication through computer-based switching systems, and store the speech on computer disks and in solid-state memory devices.

The following describes techniques that reduce the amount of data required to digitize speech.

Speech Digitization

The simplest way to encode speech digitally is to generate a sequence of numbers that, in essence, trace the 'ups and downs' of the original speech waveform. For example, if one wished to digitize a waveform in which all of the important acoustic information is below 4000 Hertz (4000 cycles per second), the basic steps of this analog-to-digital conversion would include the following:

(1) Filter from the original signal all information above 4000 Hertz.

(2) Divide the original signal into 8000 segments per second.

(3) Go through the segments in order, measuring and recording the average amplitude of the waveform within each segment.

The purpose of the first step is to prevent 'aliasing'—the creation of false artifacts, caused by the undesired interaction of the sampling rate with the frequency of the observed events. The phenomenon in motion pictures, where the spokes of a rapidly rotating wheel may appear to be standing still or even moving backwards, is an example of aliasing.

The second step, sampling at twice the frequency of the highest-frequency sine wave, is necessary in order to capture both the peaks and the valleys of the wave.

To envision the third step more easily, imagine that the original waveform is drawn on a sheet of paper. Within every segment, each of which represents 1/8000 of a second, the height of the waveform is measured with a ruler. The sequence of numbers obtained in this manner constitutes a digital representation of the original waveform.

Regarding the 'ruler' used to measure within-segment speech amplitudes, speech quality comparable to that of a modern telephone requires twelve bits per segment, 8000 segments per second. (As a point of comparison, audio compact discs use 16 bits per segment, with 44,100 segments per second.) The resulting data rate of 96,000 bits per second means that a typical 1.44 MB floppy diskette can hold only about two minutes of telephone-quality speech.

Modest reductions in the data rate can be achieved by using logarithmic amplitude encoding schemes. These techniques, which represent small amplitudes with greater accuracy than large amplitudes, achieve voice quality equivalent to a standard twelve-bit system with as few as eight bits per segment. Examples include the μ-law (pronounced 'myoo law') coding found on many U.S. digital telephones, and the A-law coding commonly used in Europe.

For many applications in which the cost of transmission or the cost of storage is important, such as wireless telephony or voice mail systems, the data rate reductions achieved with simple μ-law and A-law encoding are inadequate. One way to achieve significant reductions in the data rate is to extract and digitize the frequency content of the waveform (rather than simply digitize the shape of the waveform).

Many coders that work in this manner have software components that map to physical components of the human vocal mechanism. They reduce the data rate by encoding only the parameters that control the changeable components of the speech production model—for example, the parameter that controls overall amplitude and the parameter that adjusts the fundamental pitch of the electronic 'vocal cords.'

The Human Speech Production Mechanism

Given that many components in these coders have physiological counterparts, it is helpful to understand the human vocal mechanism prior to examining the coders.

The major physical components of the human speech mechanism include the lungs, the vocal cords, and the vocal cavity. When a person speaks, the lungs force air past the vocal cords and through the vocal cavity. The pressure with which the air is exhaled determines the final amplitude, or 'loudness,' of the speech. The action of the vocal cords on the breath stream determines whether the speech sound will be voiced or unvoiced.

Voiced speech sounds (for example, the 'v' sound in 'voice') are produced by tensing the vocal cords while exhaling. The tensed vocal cords briefly interrupt the flow of air, releasing it in short periodic bursts. The greater the frequency with which the bursts are released, the higher the pitch.

Unvoiced sounds (for example, the final 's' sound in 'voice') are produced when air is forced past relaxed vocal cords. The relaxed cords do not interrupt the air flow; the sound is instead generated by audible turbulence in the vocal tract. A simple demonstration of the role of the vocal cords in producing voiced and unvoiced sounds can be had by placing one's fingers lightly on the larynx, or voice box, while slowly saying the word 'voice'; the vocal cords will be felt to vibrate for the 'v' sound and for the double vowel (or diphthong) 'oi' but not for the final 's' sound.

The mechanisms described above produce what is called the excitation signal for speech. Many properties of the excitation signal will differ when comparing one person to another. However, when examining a single individual, only three parameters in the excitation signal will vary as the person speaks: the amplitude of the sound, the proportion of the sound that is voiced or unvoiced, and the fundamental pitch. This can be demonstrated easily. If one were to hold one's mouth wide open, without any movement of the jaw, tongue, or lips, the only remaining changeable characteristics of sound generated by the vocal system are the above three parameters.

At any given time, excitation signals actually contain sounds at many different frequencies. A voiced excitation signal is periodic. The energy in its frequency spectrum lies at multiples of the fundamental pitch, which is equal to the frequency with which the vocal cords are vibrating. An unvoiced excitation signal contains a random mixture of frequencies similar to what is generally called white noise.

The vocal cavity 'shapes' the excitation signal into recognizable speech sounds by attenuating certain frequencies in the signal while amplifying others. The vocal cavity is able to accomplish this spectral shaping because it resonates at frequencies that vary depending on the positions of the jaw, tongue, and lips. Frequencies in the excitation signal are suppressed if they are not near a vocal cavity resonance. However, vocal cavity resonances tend to amplify, or make louder, sounds of the same frequency in the excitation signal. The resulting spectral peaks in the speech sounds are called formants. Typically, only the three or four lowest-frequency formants will be below 5000 Hertz. These are the formants most important for intelligibility.

(The upper frequency limit for many audio communication systems, including the public telephone system in the United States, is on the order of 3400 Hertz. This is why speech sounds that differ chiefly in their upper-frequency formant structure, such as 'f' and 's', tend to be hard to distinguish on these systems.)

For spoken English, a simple classification of speech sounds according to manner of formation would include vowel, nasal, fricative, and plosive sounds. In the formation of vowels, such as the 'ee' sound in 'speech' and the diphthong 'oi' in 'voice,' the breath stream passes relatively unhindered through the pharynx and the open mouth. In nasal sounds, such as the 'm' and 'n' in 'man,' the breath stream passes through the nose. Fricative sounds are produced by forcing air from the lungs through a constriction in the vocal tract so that audible turbulence results. Examples of fricatives include the 's' and 'ch' sounds in 'speech.' Plosive sounds are created by the sudden release of built-up air pressure in the vocal tract, following the complete closure of the tract with the lips or tongue. The word 'talk' contains the plosive sounds T and 'k'. Except when whispering, the vowel and nasal sounds of spoken English are voiced. Fricative and plosive sounds may be voiced (as in 'vast' or 'den') or unvoiced (as in 'fast' or 'ten').

Speech Compression

The parameters computed by coders that follow this vocal tract model fall into two categories: those that control the generation of the excitation signal, and those that control the filtering of the excitation signal.

Two different signal-generating mechanisms are required in order to produce a human-like excitation signal. One mechanism generates a periodic signal that simulates the sound produced by vibrating human vocal cords. The other produces a random signal, similar to white noise, that is suitable for modeling unvoiced sounds. Thus, when a voiced sound must be produced, such as the 'ee' in 'speech,' the output from the periodic signal generator is used; for the unvoiced 'sp' and 'ch' sounds in 'speech,' the random output from the other generator is used.

In some systems, a weighted combination of the random and periodic excitation is used. This can be helpful in modeling voiced fricative sounds, such as the 'z' sound in the word 'zoo.' However, many coders restrict the excitation so that it is modeled entirely by either the voiced or unvoiced excitation source. In these coders, selection of the excitation is controlled by a two-valued voicing parameter, typically referred to as the voiced/unvoiced decision.

In addition to the voiced/unvoiced decision, the excitation function is scaled by an amplitude parameter, which adjusts its loudness. Finally, if the system is to generate something other than a monotone, it is necessary for the period of the voiced excitation source to be variable. The parameter that controls this is called the pitch parameter. In summary, three parameters are sufficient to control a simple excitation model (i.e., a model that does not take into account vocal tract differences among people): an amplitude parameter; a voiced/unvoiced parameter; and, if voiced, a pitch parameter that specifies the fundamental periodicity of the speech signal.

Various techniques have been used to simulate the manner in which the human vocal cavity imposes a particular spectral shape on the excitation signal. One of the first techniques developed uses a bank of bandpass filters, similar in many respects to the adjustable multi-band 'graphic equalizers' found on some high-end stereo systems. The center frequencies of these filters are fixed; an adjustment in the gain of each filter or channel allows the desired spectrum to be approximated, in much the same way that the spectral characteristics of a stereo system may be varied by adjusting the tone controls.

The chief drawback to this approach is the large number of filters it requires. The number of filters can be reduced if it is possible to control their center frequencies. Specifically, by matching the center frequencies of filters to the desired formant frequencies, one can encode speech with only three or four tunable bandpass filters. The important point here is that, even though the center frequencies of the filters must now be encoded along with the gains of the filters, the total number of parameters required for accurate shaping of the excitation signal is reduced greatly.

Although early speech synthesis systems relied on analog mechanisms to filter and shape the excitation signal, modern speech compression systems rely entirely on digital filtering techniques. With these systems, the decoded speech signal heard at the receiving end is the output of a digitally controlled filter that has as its input the appropriate excitation sequence. Digital control of the filter is accomplished through the use of a mathematical model—in essence, an equation with constants and variables, in which the desired spectral filtering is specified by setting the appropriate values for the variables. Great reductions in the data transmission rate are achievable with this approach because the same mathematical model is pre-loaded into both the encoder and the decoder. Therefore, the only data that must be transmitted are the relatively small number of variables that control the model.

A good example is the technique known as linear prediction, in which speech samples are generated as a weighted linear combination of previous output samples and the present value of the filter input. This yields the following expression for each output sample (S[i]) as a function of previous samples (S[i−1], S[i−2], . . . , S[i−n]), the prediction weights (A[1], A[2], . . . , A[n]) and the filter input (U[i]):

$$S[i]=A[1]S[i-1]+A[2]S[i-2]+ \ldots +A[n]S[i-n]+U[i]$$

The filter input in this equation (U[i]) is the product of the amplitude parameter and the excitation sequence. The total number of coefficients in the equation (n) determines how many spectral peaks, or formants, may be approximated.

Once the complete set of parameters (amplitude, voicing, pitch, and spectral parameters) has been specified, a speech decoder can produce a constant speech-like sound. In order to generate intelligible natural-sounding speech, the model parameters need to be updated as often as 40 to 50 times each second. To envision this process, it is helpful to recall how motion pictures work: apparent motion—in this case, a smoothly varying speech sound, rather than a smoothly varying image—is achieved by updating with sufficient frequency what are, in fact, still images. (Some systems that store speech in this format, such as Avaya's Intuity™ AUDIX® multimedia messaging system, allow users to adjust the playback rate without the shift in tone that would accompany, for example, playing a 33⅓ RPM phonograph record at 45. This is accomplished by adjusting how long each set of speech production parameters stays 'in the gate' before being updated, in much the same way that 'slow motion' is achieved with motion pictures.)

One of the first products to incorporate this style of speech compression was a children's learning aid introduced by Texas Instruments in 1978, the Speak & Spell®. It used ten-coefficient Linear Predictive Coding (LPC-10) to model speech. The data rate for this LPC-10 model was 2400 bits per second. (The actual data rate in the Speak & Spell is considerably less than 2400 bits per second because a one-bit repeat code was used when adjacent parameters were judged to be sufficiently similar.) This low data rate was achieved, in part, by 'hard-wiring' the excitation parameters that tend to vary from person to person. This meant that, if people's vocal tract characteristics differed from those that had been built into the speech production model, their voices could not be reproduced without distortion.

The ability to model a wide variety of voices accurately—as well as a variety of non-voice sounds, such as TTY/TDD tones—is achieved by systems in which the excitation function is not hard-wired, but is instead under software control. A good example is the Intuity AUDIX voice messaging system, which uses Code-Excited Linear Prediction (CELP) to model speech. The data rate for typical CELP-based systems ranges from 4800 bits per second to 16,000 bits per second. (The higher data rates are seen more frequently in systems where it is important to maximize the speech quality or reduce the computational complexity of the coder.) Compared with similar-quality uncompressed digitized speech, these techniques yield data rate reductions of at least six-to-one, and as high as twenty-to-one.

SUMMARY

A very common problem is that, when people speak a language other than the language which they are accustomed, syllables can be spoken for longer or shorter than the listener would regard as appropriate. An extreme example of this phenomenon can be observed when people who have a heavy Japanese accent speak English. Since Japanese words end with vowels instead of consonants (the only exception being words that end "n"), there is a tendency for native speakers of Japanese to add a vowel sound to the end of English words that should end with a consonant. Illustratively, native Japanese speakers often pronounce "orange" as "orenji." An exemplary aspect of the technology described herein provides an automatic speech-correcting process that would not necessarily need to know that fruit is being discussed; the system would only need to know that the speaker is accustomed to Japanese, that the listener is accustomed to English, that "orenji" is not a word in English, and that "orenji" is a typical Japanese mispronunciation of the English word "orange."

The ability to detect mispronunciations easily is just one of the factors that make appropriate syllable duration a correctable problem. The other is that frame-based speech encoding and compression techniques of the sort commonly used in telecommunication systems, such as linear predictive coding (LPC) and code excited linear prediction (CELP), include a parameter that specifies how long a specific speech sound should be reproduced. For this reason, a process that determines whether a sound (or syllable) has been spoken with the appropriate duration could, in real-time or close to real-time, correct the duration of errors it detects prior to presenting the speech to the listener by adding to or subtracting from the duration parameter that was computed during the initial coding of the speech. In addition, using the "orenji" example above, the "i" could be eliminated or reduced by the system by shortening or eliminating the time that the "i" spends in the gate. In addition, or optionally, the amplitude associated with the "i" could similarly be adjusted to reduce or eliminate it from the speech being presented to the listener.

Accordingly, an exemplary aspect is directed toward an automated telecommunication system adjunct that aids in speech understandability.

An additional aspect is directed toward a telecommunication system module that one or more of adjusts an amplitude or duration of a syllable to correct or improve the pronunciation of a mispronounced word.

According to a more specific exemplary embodiment, an automated telecommunication system adjunct performs the following:

(1) Encodes the received speech digitally, using a technique that permits the duration of distinct speech events, such as syllables, to be identified and represented as a specific, adjustable speech production parameter. Suitable speech encoding techniques include the aforementioned LPC, CELP, and the like.

(2) Detects that language A is being spoken. Automatic language identification techniques that are well known can be used for this step. Additionally, a repository can store information regarding which words, based on the language that is being spoken and the native language of the speaker, have a certain predisposition to mispronunciation.

(3) Detect that the person who is speaking language A is actually accustomed to speaking language B. Again, automatic accent identification techniques that are well known can be used with the systems, methods, and techniques disclosed herein.

(4) Use a knowledge of language A's and language B's pronunciation patterns and vocabularies to detect when a word in language A has been spoken with incorrect syllable duration because the pronunciation patterns of language B were applied inappropriately.

(5) Adjust the duration parameters associated with the misspoken syllable, lengthening or shortening the syllable to match the duration appropriate for language A. Optionally, the amplitude associated with the misspoken syllable thereby also assisting with matching the duration appropriate for language A.

(6) Use the modified speech product parameters to regenerate and present speech with the correct syllabic timing to the listener.

In addition to the above exemplary embodiment, the techniques disclosed herein can further include checks to confirm that the modifications in steps 4 and 5 above would be sensible.

More specifically, a first check could include determining whether the utterance, without modification, is a legitimate word in language A. A second check could include determining whether the utterance, if modified, would be a legitimate word in language A. A third exemplary check could determine whether the utterance is a known, common mispronunciation of a legitimate word is language A by people who are accustomed to speaking language B. A fourth exemplary check would determine whether the utterance that would be produced by step 5 above might be an inappropriate word or phrase in language A, e.g., an utterance that would be interpreted as rude or offensive.

Based on the above checks, a decision could be made to skip step 5.

In accordance with another exemplary embodiment, for step 5, a partial, rather than full adjustment, of the syllable could be performed such that the duration error is reduced but not eliminated.

In accordance with another exemplary embodiment, real-time visual feedback could be provided to one or more of the talker and listener to indicate when the voice stream has been modified.

In accordance with another exemplary embodiment, one or more of the parties, such as the listener, could be provided with an appropriate interface that allows them to enable, disable, or adjust the syllable-modification procedures.

In accordance with another exemplary embodiment, and in addition to unidirectional processing, i.e., processing person A's speech to person B, an exemplary implementation could support bi-direction processing, i.e., person A's speech to person B and person B's speech to person A.

In accordance with yet another exemplary embodiment, the speaker's original unmodified speech and modified speech could be simultaneously provided to a listener via separate audio channels and/or via separate audio transducers at the listener's location. The listener could monitor both simultaneously or choose the signal that sounds best at that point in time. Such a configuration might also be helpful if there are multiple listeners at multiple locations, each with his or her own listening preferences. For example, the modified, or unmodified, speech could be presented in a second channel of information, such as a whisper channel, and this could prove especially useful for calls that are recorded such that both the original verse the modified call is maintained.

In accordance with yet another exemplary embodiment, the techniques disclosed herein may also be useful in voice messaging systems, where the system could process messages to make it easier for the mailbox owner to understand what was said.

These and other advantages will be apparent from the disclosure contained herein. The above-described embodiments and configurations are neither complete nor exhaustive. As will be appreciated, other embodiments of the invention are possible utilizing, alone or in combination, one or more of the features set forth above or described in detail below.

As used herein, "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

BRIEF DESCRIPTION OF THE DRAWINGS

The exemplary embodiments of the invention will be described in detail, with reference to the following figures, wherein.

DETAILED DESCRIPTION

Some embodiments will be illustrated below in conjunction with an exemplary communication system. Although well suited for use with, e.g., a system using switch(es), server(s) and/or database(s), the embodiments are not limited to use with any particular type of communication system or configuration of system elements. Those skilled in the art will recognize that the disclosed techniques may be used in any communication application in which it is desirable to provide enhanced understandability of one party by another.

Figure 1:
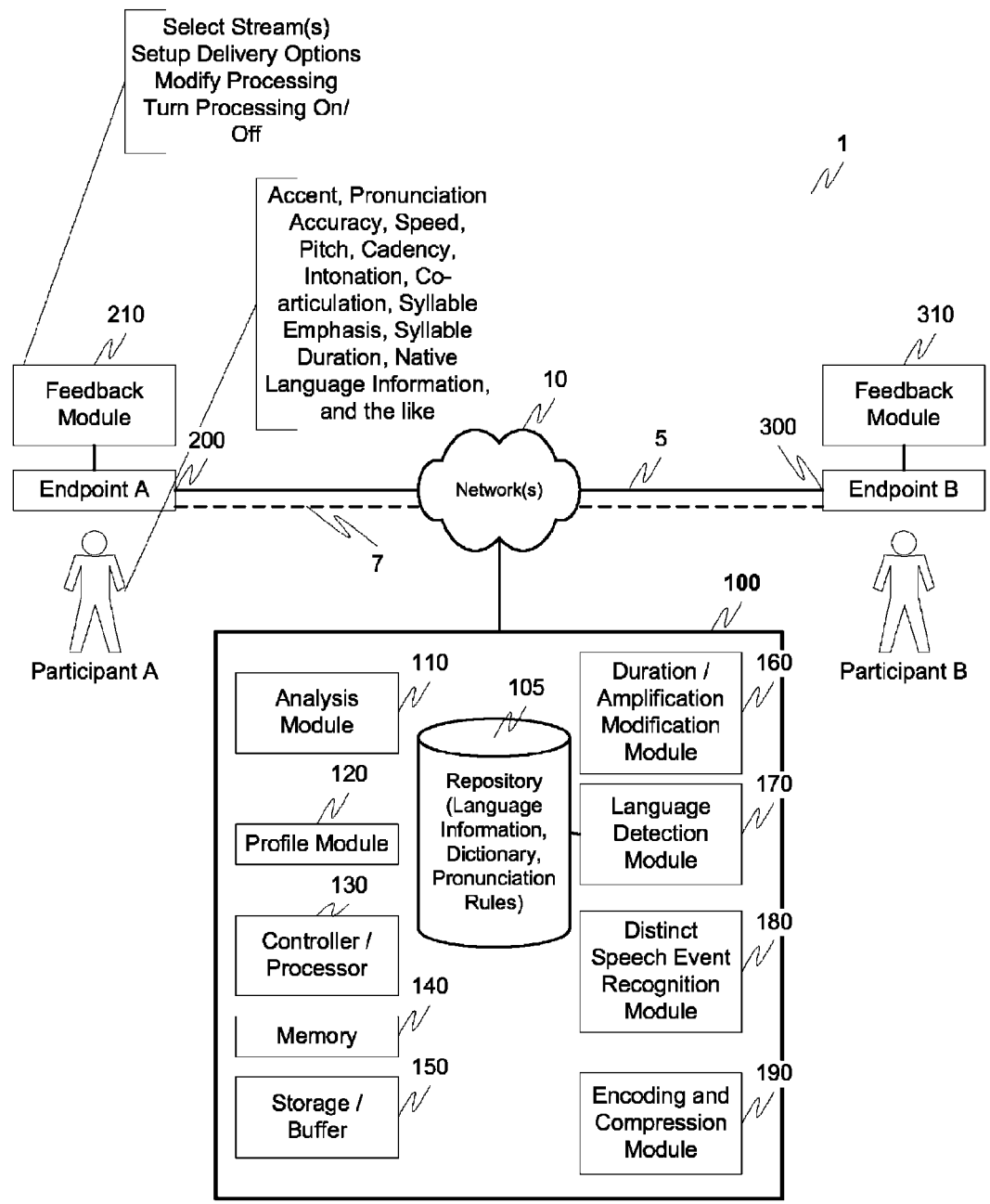
FIG. 1 illustrates an exemplary communication enhancement system.

Referring initially to FIG. 1 an exemplary communication environment 1 will be described in accordance with at least some embodiments. The communication system comprises a communication network connecting a plurality of communication devices optionally to, for example, a conference bridge.

In one embodiment, the communication system may include a switch that may include a private branch exchange (PBX) system or any similar type of switching system capable of providing a telephone service to one or more entities such as an enterprise associated with the switch. The switch may be one of a number of known exchange systems including, but not limited to, Private Automated Branch Exchange (PABX), Computerized Branch Exchange (CBX), Digital Branch Exchange (DBX), or Integrated Branch Exchange (IBX). The switch may also comprise a switching fabric that provides for the connection of multiple endpoints such as communication devices associated with the conference participants, servers, and databases. The switching fabric can provide the functionality to direct incoming and/or outgoing calls to various endpoints and further provides for conferencing capabilities between endpoints.

The communication devices associated with the participants may be packet-switched or circuit-switched and can include, for example, IP hardphones such as the Avaya Inc.'s, 4600 Series IP Phones™, IP softphones such as Avaya Inc.'s, IP Softphone™, Personal Digital Assistants or PDAs, Personal Computers or PCs, laptops, packet-based H.320 video phones and conferencing units, packet-based voice messaging and response units, packet-based traditional computer telephony adjuncts, and conventional wired or wireless telephones.

FIG. 1 illustrates an exemplary communications environment 1 according to an exemplary embodiment. The communications environment 1 includes a normalization system or adjunct 100, and one or more endpoints, such as endpoint A 200 and endpoint B 300. Associated with each endpoint can be an optional feedback/input module, such as feedback/input modules 210 and 310. The various endpoints are connected via one or more networks 10, and links 5 and 7, with link 7 being for example of an alternative communication path.

The endpoints can be any communications endpoint, such as a phone, speaker phone, microphone, multimedia endpoint, or the like, which is capable of communicating over one or more networks 10 such as a public-switch telephone network, a packet-switch telephone network, VOIP network, SIP-enabled network, or in general any communications network utilizing any one or more communications protocols.

The normalization system or adjunct 100 includes an analysis module 110, a profile module 120, controller 130, memory 140, storage/buffer 150, duration/amplification modification module 160, language detection module 170, distinct speech event recognition module 180, coding and compression module 190 and repository 105.

In an exemplary operational mode, a normalization system 100, in cooperation with the analysis module 110, receives speech from one or more endpoints. Next, and in cooperation with the distinct speech event recognition module 180, distinct speech events are detected. This is accomplished by encoding received speech and using a technique that permits the duration of distinct speech events, such a syllables, to be identified and represented as a specific, adjustable speech production parameters. Examples of these types of techniques include LPC and CELP as discussed above. Once the received speech is encoded, the identified distinct speech events are represented as specific, adjustable speech production parameters.

In cooperation with the language detection module 170, and repository 105, the analysis module 110, cooperating with one or more of the profile module 120, controller 130, memory 140, and storage/buffer 150 determines the language being spoken. In addition, the "native" language of the speaker can also be detected. This can be done, for example, in real-time on the received speech or, alternatively or in addition, retrieve the profiles stored in the profile module 120. This profile can be associated with an endpoint and/or a person based on one or more identities, such as caller ID information, or information received from the person via the feedback/input module.

The analysis module 110, cooperating with the repository 105, then utilizes the knowledge of the language being spoken and the native language of the speaker to detect when a word or words in the language being spoken have incorrect syllable duration because the pronunciation patterns of the "native" language were applied inappropriately. Once these one or more incorrect syllable durations have been identified, and in cooperation with the duration/amplification modification module 160, controller 130, memory 140, and storage/buffer 150, one or more of the duration and amplitude parameters associated with the misspoken syllable are adjusted to one or morel of lengthen, shorten, emphasized, deemphasized, or otherwise adjust as appropriate in an attempt to align the misspoken word with the correct pronunciation of that word.

Once these one or more parameters have been adjusted, this modified speech product is used as the basis of a regenerated speech product that can then be presented with the correct or more correct syllabic timing/emphasis to a listener. In accordance with one exemplary embodiment, this modified speech product is provided on the normal communication channel, as an alternative to the actual speech spoken by the speaker. In accordance with another exemplary embodiment, this modified speech product is provided on alternative communication path 7 such as via a whisper channel to the listener. The controller 130, cooperating with the input module 210/310 is able to allow the user to select various options regarding how the normalization system operates. For example, a user can select whether they would like the normalization system to be turned on or off, they can set up delivery options, e.g., to hear the modified speech on a whisper channel, to have the modified speech on the main channel, and the original speech on a whisper channel, only hear the modified speech, or the like. In addition, the user can select how to handle the various streams, such as recording of one or more of the original or modified speech streams as well as optionally saving meta information about the processing performed by the duration/amplification modification module.

In greater detail, the adjusting of the parameters associated with the misspoken syllable can be based on a number of criteria. For example, and in cooperation with the repository 105, after the adjustment is made a determination can be made whether the utterance, without modification, is a legitimate word in the spoken language. For example the repository 105 can be queried, and more particularly, the dictionary and pronunciation rules therein, to determine if the word is legitimate. In addition, a determination can be made whether the utterance, if modified, is a legitimate word in the spoken language in the same manner.

In even greater detail, the repository 105 can be queried to determine if the utterance is a known, common mispronunciation of a legitimate word in the spoken language by people who are accustomed to speaking the "native" language. For example, the normalization system 100 can a mask this data by comparing numerous conversations between numerous participants to one or more portions of information being logged and stored in the repository 105 to optionally enhance the performance and accuracy of the normalization system.

As another check, the duration/amplification modification module 150 can cooperate with the repository 105 to determine whether the utterance that would be produced by the duration/amplification modification module 160 might be an inappropriate word or phrase in the spoken language. For example, if an utterance could be interpreted as rude or offensive, the analysis module 110 could one or more of further modify, delete, and provide information to the speaker about that particular utterance. For example, if it is determined that the utterance would be interpreted as rude or offensive, real-time feedback could be provided to the speaker via the input module indicating their mispronunciation of the word could cause problems.

In accordance with an additional or alternative exemplary embodiment, the duration/amplification modification module could make a partial rather than full adjustment to a syllable such that the duration error is reduced but not eliminated.

In a similar manner, feedback can also be used to optionally provide information to the speaker and/or listener to indicate when the voice stream being presented has been modified. This can again be provided via the feedback/input module 210/310 in one or more of an audible, visual, graphical, multimedia-based or comparable notification technique.

As previously discussed, this feedback/input module could also be used to optionally allow a party to enable, disable, or otherwise adjust the syllable modification techniques performed by the normalization system 100. For example, an interface can be provided that allows a user to adjust the "aggressiveness" or the "corrections" made by the normalization system 100 as well to modify how the modified speech and/or original speech are delivered. This could be especially useful in situations where both the original and modified speech need to be preserved. In this example, both the modified and the original speech could be present and/or saved on different channels, such as via communications link 5 and the alternative communication path 7.

One of the benefits of using LPC and CELP by the duration/amplification modification module 160 is that the amount of time a syllable spends in a gate is varied, with the net effect being the lengthening or shortening of a syllable, without causing a pitch shift. This in combination with optionally adjusting the amplitude of the syllable can be utilized very effectively to correct mispronunciation errors, such as "orenji" as discussed above.

Figure 2:
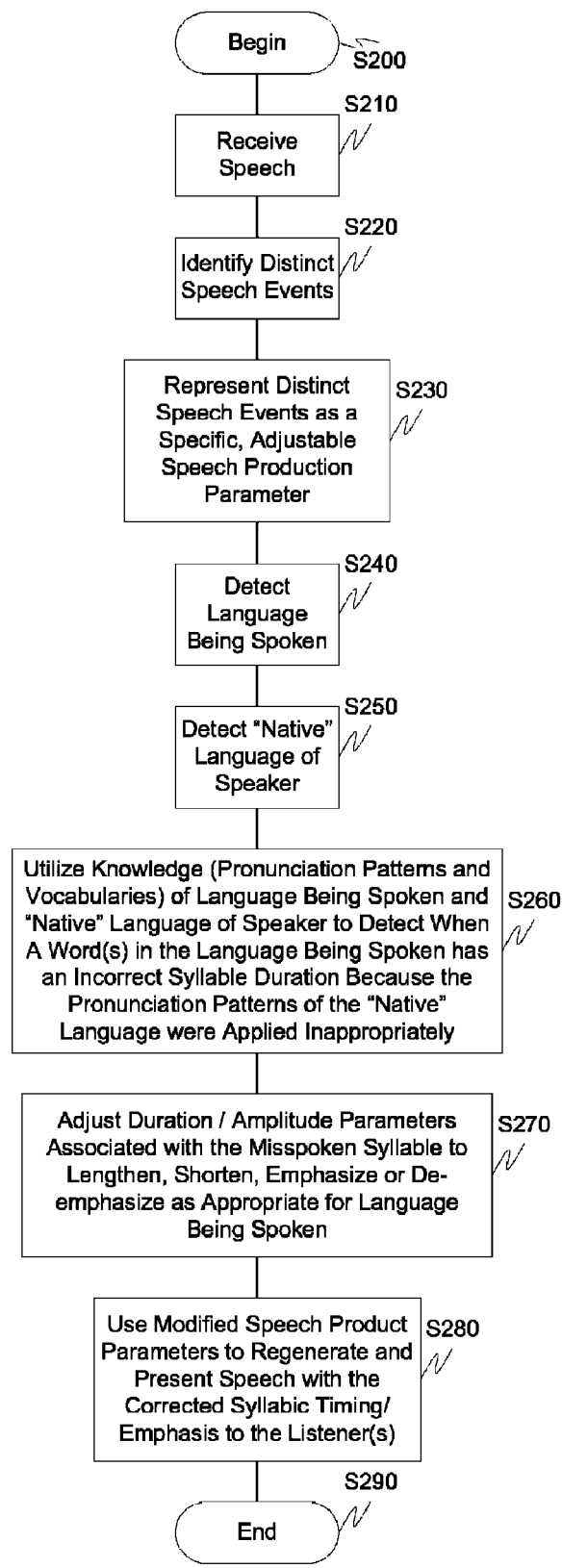
FIG. 2 is a flowchart illustrating a method for enhancing communication.

FIG. 2 outlines an exemplary method of operation of a normalization system or adjunct. In particular, control begins in step S200 and continues to step S210. In step S210, speech is received and encoded. Next, in step S220, distinct speech events are identified. Then, in step S230, the distinct speech events are represented as specific, adjustable speech production parameters. Control then continues to step S240.

In step S240, the language being spoken is detected. Then, in step S250, the "native" language of the speaker is one or more of detected or retrieved from, for example, a profile associated with the speaker. Control then continues to step S260.

In step S260, knowledge, such as pronunciation patterns and vocabularies, of the language being spoken and the "native" language of the speaker are utilized to detect when one or more words in the language being spoken have an incorrect syllable duration because the pronunciation patterns of the "native" language were applied inappropriately to the spoken language. Next, in step S270, one or more of the duration and amplitude parameters associated with the misspoken syllable are adjusted to one or more of lengthen, shorten, emphasized, or deemphasized as appropriate to correct the incorrect syllable duration for the language being spoken. Then, in step S280, the modified speech product parameters are used to regenerate and present corrected speech that has the modified syllabic timing/emphasis for presentation to one or more listeners. Control then continues to step S290 where the control sequence ends.

Figure 3:
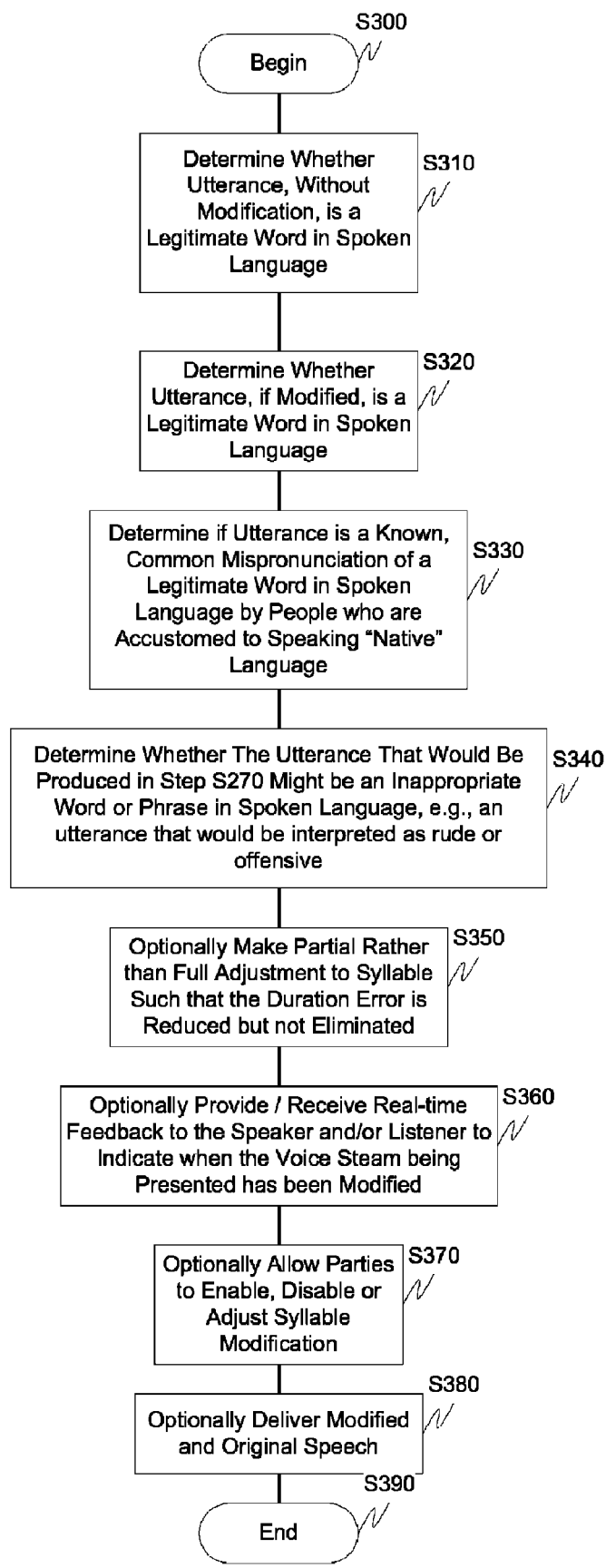
FIG. 3 is a flowchart illustrating in greater detail method of enhancing communication.

FIG. 3 illustrates in greater detail steps S260-S280. More specifically, control begins in step S300 and continues to step S310. In step S310, a determination is made whether the utterance, without modification, is a legitimate word in the spoken language. This can be done by comparing the utterance with a dictionary and optionally one or more pronunciation rules. Next, in step S320, a determination can be made whether the utterance, if modified, would be a "more legitimate" or legitimate word in the spoken language. Again, this can be done with a comparison to one or more of a dictionary and pronunciation rules that can be stored in, for example, a repository.

Then, in step S330, a determination can be made if the utterance is a known, common mispronunciation of a legitimate word in the spoken language by people who are accustomed to speaking "native" language. Again, this can be done by a comparison of the utterance to a word stored in the repository. Control then continues to step S340.

In step S340, a determination can optionally be made whether the utterance would be an inappropriate word or phrase in the spoken language. If this is the case, feedback can optionally be immediately relayed to the presenter indicating that their pronunciation is inappropriate, which may lead to problems. Control then continues to step S350.

In step S350, and instead of making a full adjustment to a syllable, a partial adjustment can optionally be made such that the duration error is reduced, but not eliminated. Next, in step S360, and as eluded to above, optional feedback can be provided to one or more of the speaker and listener to indicate, for example, when the voice stream has been modified. As will be appreciated, this can be provided back to the speaker, to the listener, or to both.

An optional exemplary step S330 allows one or more of the parties to enable, disable, or adjust the modifications made by the normalization system. For example, a party can be allowed to turn on, turn off, and/or adjust the "aggressiveness" with which the normalization system is applying its syllabic modification techniques. Moreover, in step S380 users can optionally be provided with the ability to modify delivery modification options. For example, a user can select which one or more audio streams, e.g., original, modified, or both they would like to receive. For example, in a stereo environment, a user may elect to receive the original version in channel A and the modified version in channel B. In another exemplary embodiment, the user may want to receive the modified version, with the original version being presented in a whisper channel. In yet another exemplary embodiment, the user may want to receive the modified speech, but have the original recorded. In yet another exemplary embodiment, both the original and the modified speech could both be recorded or, for example, archival purposes. As will be appreciated, a device associated with the input can be utilized to receive various inputs from a listener that allows them to modify exactly how they would like to hear one or more of the original and modified speech of a speaker. Control then continues to step S390 where the control sequence ends.

In accordance with another exemplary embodiment, it should appreciated that the techniques disclosed herein are not limited to two parties, but can be extended to multiparty calls. In this example, it may be appropriate to utilize the techniques herein for only a portion of the communications channels in that some of the speakers may be speaking their native language, while others may be speaking in a language other than their native language.

Another optional feature is to utilize a profile, and in cooperation with a profile module 120, have this profile cooperate with the duration/amplification modification module 160 correct commonly mispronounced words by a party. For example, the profile module 120 can store a directory of words that are always misspoken by a particular person. The duration/amplification modification module 160, knowing that a particular person historically always mispronounces a particular word, can use this historical information to assist with dynamically correcting the mispronunciation in real or near real-time. Utilizing this stored historical information can also help reduce the computational burden placed on the normalization system in that if the modified word has already been vetted to be a legitimate word, is in the dictionary, does not violate any pronunciation rules, and is not interpretable as rude or offensive, then clearly steps could be bypassed by the normalization system each time that mispronunciation occurs.

In accordance with another exemplary embodiment, and again to further assist reducing the computation burden on the system, buffer 150 can be utilized such that words identified as misspoken in the same conversation can have the corrected version retrieved from the buffer and presented as the modified utterance to the other participant(s). Thus, instead of having to perform a majority of the steps enumerated above, once the misspoken word is (again) detected, the analysis module 110 can immediately substitute the modified version of the utterance as stored in the buffer.

The various embodiments include components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, includes providing devices and processes in the absence of items not depicted and/or described herein or in various embodiments hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the invention to the form or forms disclosed herein. In the foregoing Detailed Description for example, various features of the invention are grouped together in one or more embodiments for the purpose of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as separate preferred embodiments.

Moreover, though the description of the invention has included description of one or more embodiments and certain variations and modifications, other variations and modifications are within the scope of the disclosure, e.g., as may be within the skill and knowledge of those in the art, after understanding the present disclosure. It is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

While the above-described flowcharts have been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols described herein can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a phone, any comparable means, or the like. In general, any device capable of implementing a state machine that is in turn capable of implementing the methodology illustrated herein can be used to implement the various communication methods, protocols and techniques disclosed herein.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The communication systems, methods and protocols illustrated herein can be readily implemented in hardware and/or software using any known or later developed systems or structures, devices and/or software by those of ordinary skill in the applicable art from the functional description provided herein and with a general basic knowledge of the computer and communication arts.

Moreover, the disclosed methods may be readily implemented in software that can be stored on a non-transitory storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with the present invention, systems, apparatuses and methods for enhanced communications understandability. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this disclosure.

The invention claimed is:

1. A method to improve communications understandability comprising:
   receiving speech from a speaker;
   identifying one or more distinct speech events in the received speech;
   representing one or more of the one or more distinct speech events as an adjustable speech production parameter;
   detecting a language of the speech;
   detecting a native language of the speaker;
   utilizing a knowledge base of pronunciation patterns and vocabularies for the language of the speech and the native language to determine an incorrect syllable duration caused by a mispronunciation; and
   adjusting at least one of duration and amplitude parameters associated with the mispronunciation to one or more of lengthen, shorten, emphasize or deemphasize the syllable;
   using the adjusted at least one of duration and amplitude parameters to regenerate and present modified speech with at least one of corrected syllabic timing and emphasis to a listener, wherein the listener can select via a feedback module to listen to the speech and the modified speech simultaneously;
   wherein the receiving, the identifying, the representing, the utilizing, and the adjusting are performed by modules in a normalization system.

2. The method of claim 1, further comprising using modified speech product parameters to regenerate and present speech with a corrected syllabic timing to one or more listeners.

3. The method of claim 1, further comprising determining whether an utterance is a legitimate word.

4. The method of claim 1, further comprising determining if an utterance is a common mispronunciation.

5. The method of claim 1, further comprising providing feedback to a speaker.

6. A system for improving communications understandability comprising:
   means for receiving speech from a speaker;
   means for identifying one or more distinct speech events in the received speech;

means for representing one or more of the one or more distinct speech events as an adjustable speech production parameter;
means for detecting a language of the speech;
means for detecting a native language of the speaker;
means for utilizing a knowledge base of pronunciation patterns and vocabularies for the language of the speech and the native language to determine an incorrect syllable duration caused by a mispronunciation; and
means for adjusting at least one of duration and amplitude parameters associated with the mispronunciation to one or more of lengthen, shorten, emphasize or deemphasize the syllable;
means for using the adjusted at least one of duration and amplitude parameters to regenerate and present modified speech with at least one of corrected syllabic timing and emphasis to a listener, wherein the listener can select via a feedback module to listen to the speech and the modified speech simultaneously;
wherein the receiving, the identifying, the representing, the utilizing, and the adjusting are performed by modules in a normalization system.

7. A non-transitory computer readable information storage media having stored thereon instructions that, if executed by a processor, cause to be performed the method of claim 1.

8. A system that improves communications understandability comprising:
an analysis module that receives speech from a speaker;
a distinct speech event recognition module cooperating with an encoding and compression module to identify one or more distinct speech events in the received speech, represent one or more of the one or more distinct speech events as an adjustable speech production parameter, detect a language of the speech, and detect a native language of the speaker; and
a modification module that utilizes a knowledge base of pronunciation patterns and vocabularies for the language of the speech and the native language to determine an incorrect syllable duration caused by a mispronunciation, adjusts at least one of duration and amplitude parameters associated with the mispronunciation to one or more of lengthen, shorten, emphasize or deemphasize the syllable, and uses the adjusted parameters to regenerate and present modified speech with at least one of corrected syllabic timing and emphasis to a listener, wherein the listener can select via a feedback module to listen to the speech and the modified speech simultaneously.

9. The system of claim 8, wherein modified speech product parameters are used to regenerate and present speech with a corrected syllabic timing to one or more listeners.

10. The system of claim 8, further comprising a processor that determines whether an utterance is a legitimate word.

11. The system of claim 8, wherein the analysis module further determines if an utterance is a common mispronunciation.

12. The system of claim 8, wherein the feedback module provides feedback to a speaker.

13. The system of claim 8, wherein a participant can select via the feedback module one or more of a modified and unmodified stream to listen to.

14. The system of claim 8, wherein a further determination is made as to whether a modified word is inappropriate.

* * * * *